US007092562B2

United States Patent
Viala et al.

(10) Patent No.: US 7,092,562 B2
(45) Date of Patent: Aug. 15, 2006

(54) METHOD FOR MEASURING A THREE-DIMENSIONAL OBJECT, OR ASSEMBLY OF OBJECTS

(75) Inventors: Marc Viala, Guyancourt (FR); Sylvie Naudet, Palaiseau (FR); Patrick Sayd, Palaiseau (FR); Laurent Cohen, Paris (FR); Arnauld Dumont, Le Mesnil-Saint-Denis (FR); Frédéric Jallon, Poigny la Foret (FR)

(73) Assignees: Commissariat a l'Energie Atomique, Paris (FR); Compagnie Generale des Matieres Nucleaires, Velizy-Villacoublay (FR)

( * ) Notice: Subject to any disclaimer, the term of this patent is extended or adjusted under 35 U.S.C. 154(b) by 451 days.

(21) Appl. No.: 10/019,871

(22) PCT Filed: Apr. 26, 2001

(86) PCT No.: PCT/FR01/01274

§ 371 (c)(1),
(2), (4) Date: Dec. 26, 2001

(87) PCT Pub. No.: WO01/81858

PCT Pub. Date: Nov. 1, 2001

(65) Prior Publication Data

US 2005/0063581 A1    Mar. 24, 2005

(30) Foreign Application Priority Data

Apr. 27, 2000 (FR) .................................. 00 05392

(51) Int. Cl.
*G06K 9/00* (2006.01)
(52) U.S. Cl. ...................... 382/154; 382/199; 382/203; 382/206; 345/419
(58) Field of Classification Search ................ 382/154, 382/199, 203, 286, 293, 242, 243; 348/580, 348/42, 47; 345/419, 441
See application file for complete search history.

(56) References Cited

U.S. PATENT DOCUMENTS

| 5,528,194 A | * | 6/1996 | Ohtani et al. ................ 382/293 |
| 5,537,494 A | | 7/1996 | Toh |
| 6,249,285 B1 | * | 6/2001 | Madden et al. .............. 345/419 |

FOREIGN PATENT DOCUMENTS

| DE | 43 25 269 A | 2/1995 |
| GB | 2 272 515 A | 5/1994 |

* cited by examiner

*Primary Examiner*—Matthew C. Bella
*Assistant Examiner*—John Strege
(74) *Attorney, Agent, or Firm*—Pearne & Gordon LLP

(57) ABSTRACT

In this system, three-dimensional objects (1, 5, 6) in an environment that may be very complex are discerned by identifying their simple contour shapes on images, and the geometric characteristics of these objects and their positions and orientations are then measured. Contours are defined by simple length, inclination, position parameters, etc. The acquired knowledge of the environment is used in each new image to refine the estimates, while introducing new object contours that have appeared, into the model.

13 Claims, 5 Drawing Sheets

METHOD FOR MEASURING A THREE-DIMENSIONAL OBJECT, OR ASSEMBLY OF OBJECTS

The invention is a process for determining the geometry, position and orientation of one or several objects in an environment. The objective is to provide dimensional or measurement information on three-dimensional primitives (dots, straight lines, circles, cylinders, etc.) representing these objects using a projection on images acquired by one or several sensors. These dimensional data are used for the dimensional check of manufactured objects (prototype or series production), the measurement of structural deformation, and modeling of industrial environments.

There are several major families of processes to accomplish this type of measurement. Some involve direct measurement of objects in the environment by the tip of a feeler, but this method cannot always be applied and it becomes very long as soon as the environment becomes voluminous or cluttered, or if its shape is complicated; This method is unthinkable when the environment is the size of a complete room. Other methods make use of range finding, in other words distances are measured to various dots in the environment without any physical contact; a laser is moved towards these dots, one at a time, and the measurement is made on the flight time or phase shift of the wave. A mirror or a mechanical system is used to continuously move the laser ray towards other dots, to enable fast measurements of the environment, but it is found that this method is not always very precise (although the resolution is limited only by the laser scanning system) and is accompanied by errors when the beam touches reflecting objects, and it is also necessary to maintain the stability of the mechanical system while scanning and to take care to guarantee the safety of any persons within the measurement volume.

Other methods include optical methods in which a camera is moved in front of the environment to be measured and takes a sequence of images. The details of the environment are identified on the different images and their position is calculated by triangulation based on their position on the different images and the known positions as the camera advances, as a function of image taking parameters of the camera. Sometimes, a network of dots is identified in the environment, these dots being illuminated by a laser or projector in a beam of rays; additional light may be added to better illuminate the surroundings around the dots network and to make it stand out from the rest of the environment. The use of an illumination means resembles range finding processes and introduces corresponding disadvantages of inaccuracy and lack of safety, that do not always compensate for the speed and ease of identification and the calculations that can frequently be carried out.

In other methods, the dots to be measured are light sources, reflecting or colored marks previously placed in the environment. These methods give good results if the marks and their positions are suitably chosen, but they are not applicable in all cases and particularly for large complicated environments; in particular, they are useful for monitoring the position of a determined object moving in the environment, rather than for measuring the environment itself.

Finally, other optical processes are based on the lack of marks in the environment and on measuring some points of interest in images. The points of interest are chosen automatically, or the operator may choose them in the case of interactive processes. Interactive processes have the advantage that they are universal or theoretically applicable to any environment, but it is not always easy to have a sufficiently large number of points of interest that are common to all images; the step in which each dot is identified on different images may be difficult; furthermore, a description of an environment by even a large number of dots is not very meaningful.

The invention consists of a process included in purely optical methods and more precisely methods that include an image analysis. This new process may include triangulation, but it is fundamentally different from previous processes, in that in this case we are interested in distinguishing details of the environment rather than drawing up a map of the dots in it. It is often easier and more useful to discern a specific element of the environment and to distinguish it from the rest, rather than to have a complete but indistinct knowledge about this environment. In the frequently encountered case of measuring industrial rooms, this consideration will be particularly important when there are a lot of different elements and obstacles of a simple shape, that are superposed and create a very complicated relief, but interpretation of the resulting representation is much easier when these elements are distinguished and when they are characterized by a few position and shape parameters.

The process has many advantages: there is not really any dot in making specific marks in the environment; a much larger portion of the information in the images is used than if points of interest only are considered, which must give better precision of the resulting representation; the process is efficient even with a variety of diffusing or reflecting surfaces; it is applicable to a variety of volumes, possibly very large; the acquisition time is very fast, a few tens of milliseconds; the process may be fully automated; the representation may be completed later by adding new entities which had been neglected earlier, or by correcting it with updates or other operations; and since it immediately supplies a correct model of the environment, it can be used immediately, whereas a map of dots needs to be interpreted.

The process is based on a system composed of five main modules defined in the following list:
  an image processing module that precisely locates natural contours of objects to be reconstructed;
  a reconstruction and positioning module that determines the geometric parameters of objects and the situation of the image capture system;
  an identification module that automatically searches for natural contours of previously reconstructed objects;
  a module matching points of interest to help replace these contours of reconstructed objects on a new image;
  and a reconstruction module in blocks making an overall (summary) calculation based on all available information and very much improving the precision.

The use of this process requires one or several previously calibrated video cameras (although calibration is not necessary if dot type primitives are used exclusively), in order to determine the relation between any dot on the image and the position of the associated light ray. Preliminary calibrations have already been described by different authors, for example the article by Viala, Chevillot, Guérin and Lavest: "Mise en oeuvre d'un procédé d'étalonnage précis de camera CCD—Implementation of a process for precise calibration of a CCD camera" presented at the 11th Conference on Shape Recognition and Artificial Intelligence (Clermont-Ferrand, Jan. 20 to 22, 1998). When several cameras are used, the system is said to be stereoscopic and is capable of automatically giving a three-dimensional model of the environment by searching for corresponding dots on the images and triangulation. If a single camera is used, the same result can be obtained by successive images by moving the camera by a determined distance. This distance may also be determined afterwards by calculation, if a standard meter is available in the environment.

In summary, the invention relates to a process for measuring three-dimensional objects in a three-dimensional environment, consisting of taking at least one image by at least one camera and creating a representation of the environment based on an analysis of the image, characterized in that the analysis comprises detection of discontinuities in the appearance of the image, a combination of discontinuities detected at geometric contours defined on the image by parameters, an adjustment of contours to discontinuities by varying the parameters, an estimate of the shape and position in the environment of geometric objects projecting onto the image according to the said contours, the representation showing the said objects.

The representation of the environment is added to every time that a new image is taken or when additional information is supplied. The process can also include initial estimates of the position of objects or the camera starting from information given manually or in a computer description file.

In general, the process can be carried out with many alternatives and with flexibility depending on the situation encountered. One possibility with some of the best embodiments is a correction to the position of objects by estimating positions of projections of the objects onto the images, based on the respective positions of the camera after the images have been taken, and by adjusting the estimated positions of the projection based on the measured positions of the projection on the images.

This correction is usually made during a final summary calculation in which the total representation error is estimated and then minimized; the estimate of camera parameters can also be corrected.

We will now describe a specific embodiment of the invention with reference to the following figures.

Figure 2:
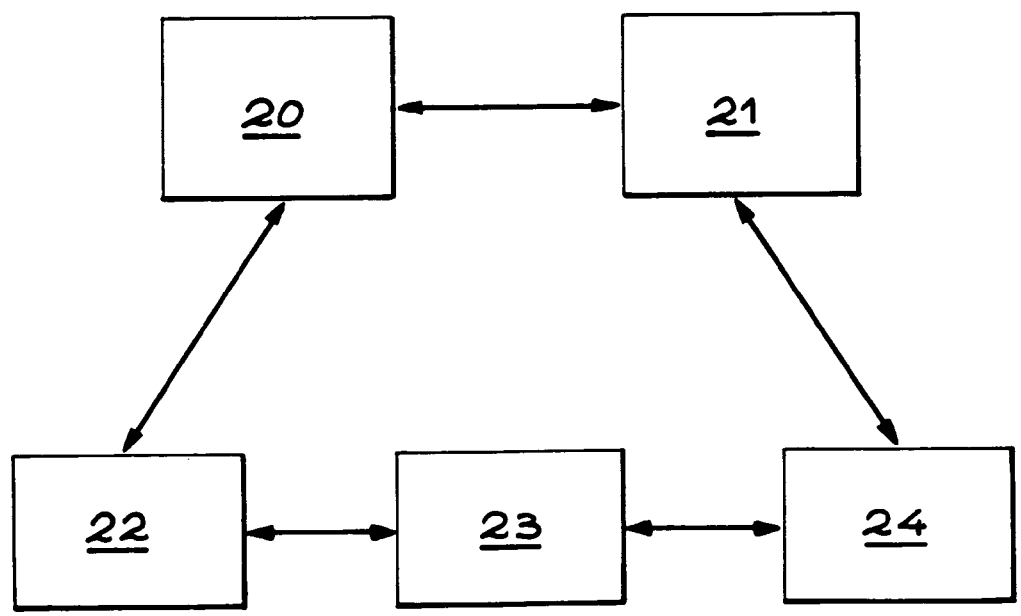
Figure 7:
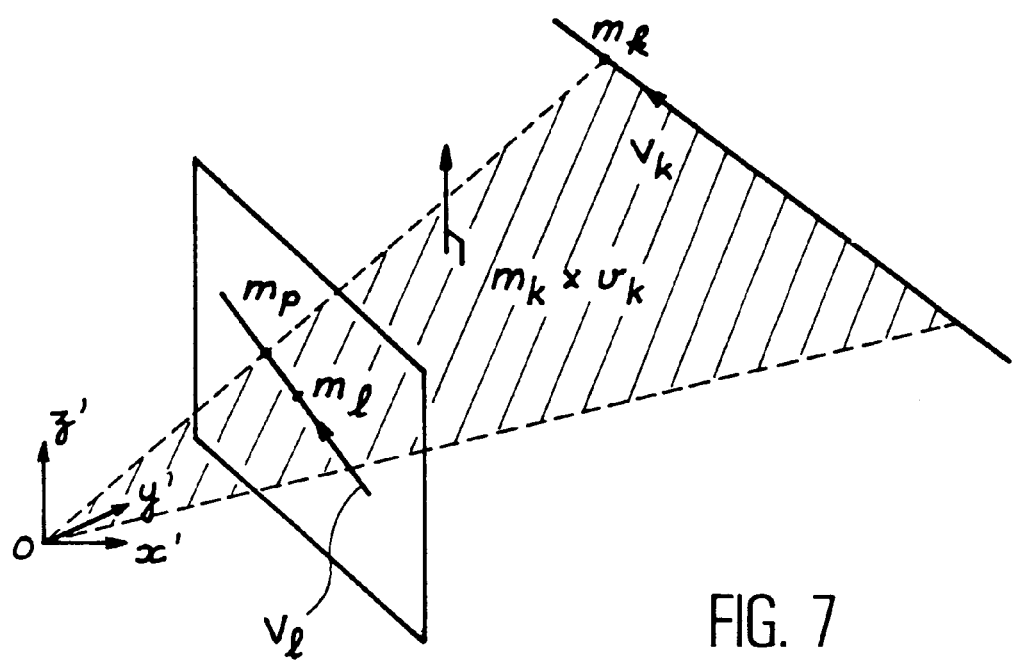
Figure 8:
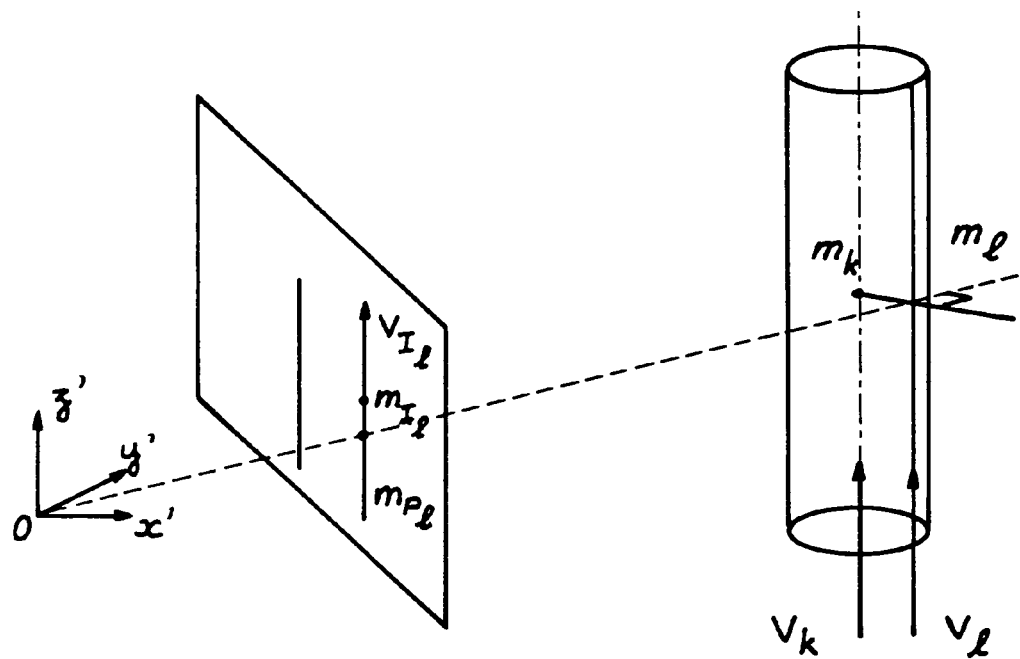

FIG. 2 diagrammatically shows processing modules of the examination system;

FIGS. 3, 4, 5 and 6 illustrate contour models;

and FIGS. 7 and 8 describe some notations used in the description.

Figure 1A:
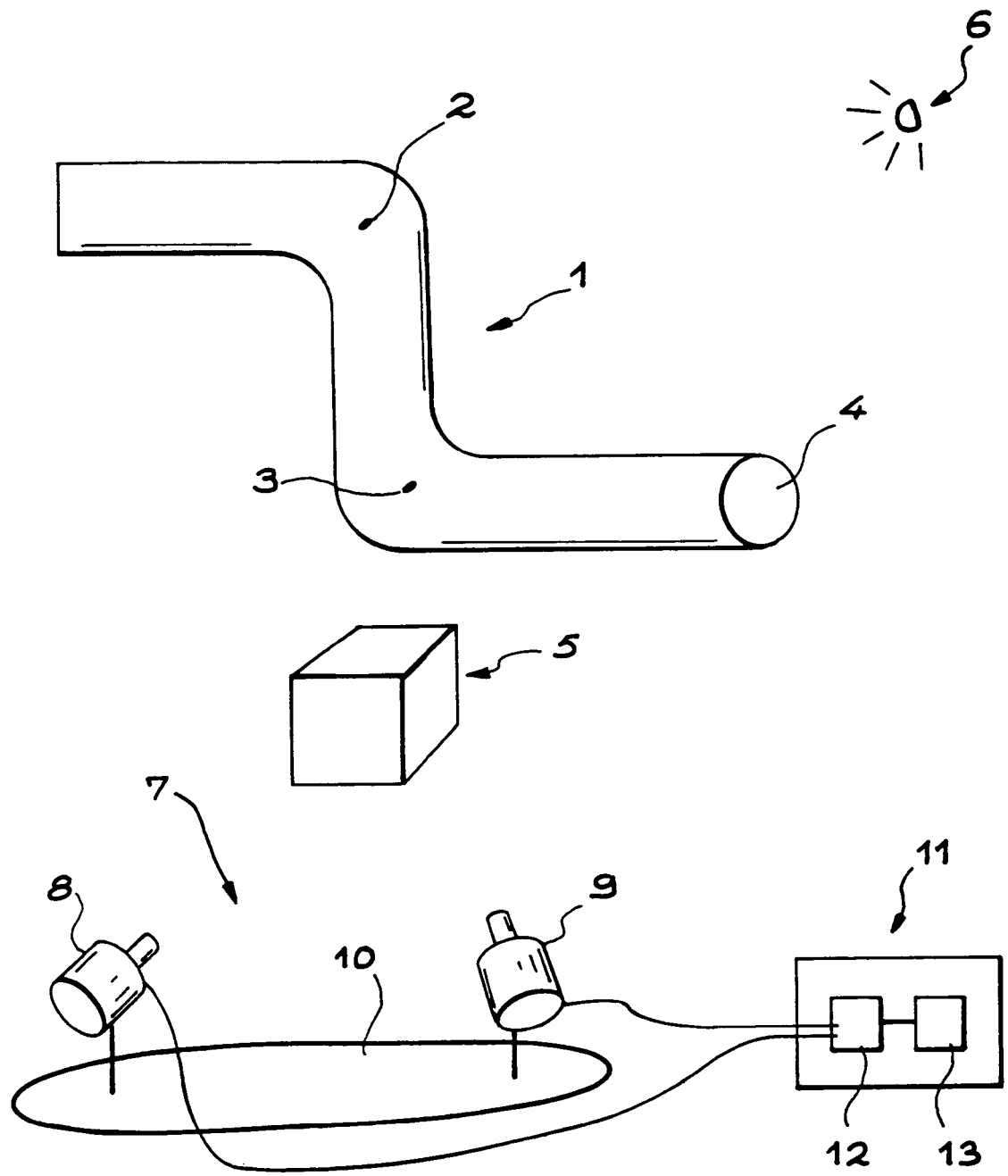
FIG. 1A is a diagram showing an examination system in a typical environment.

The modules mentioned above are referenced with marks 20 to 24 on FIG. 2; they will now be described in sequence using the example in FIG. 1A, in which the environment to be recognized comprises a pipe 1 with a double bend at 2 and 3, and finishing at an opening 4, a box 5 and an lamp 6. The display equipment, called sensor 7, comprises two rigidly installed video cameras 8 and 9 (although they could be adjustable if necessary) on a common support 10 connected to an operating system 11 that in particular comprises a memory 12 in which the images from cameras 8 and 9 are stored, and a processing unit 13. The process according to the invention consists of using the images one after the other to create a representation of the environment that is added to and clarified when interpreting each new image. This work is essentially automatic, although in some circumstances an operator must apply his judgment in practice to complete or correct the representation.

A representation of the environment means a measurement of geometric or dimensional characteristics of one or several objects, measurement of geometric or dimensional characteristics of elements or objects forming a scene or an environment. This term also relates to the measurement of the position and orientation of one or several objects.

Figure 1B:
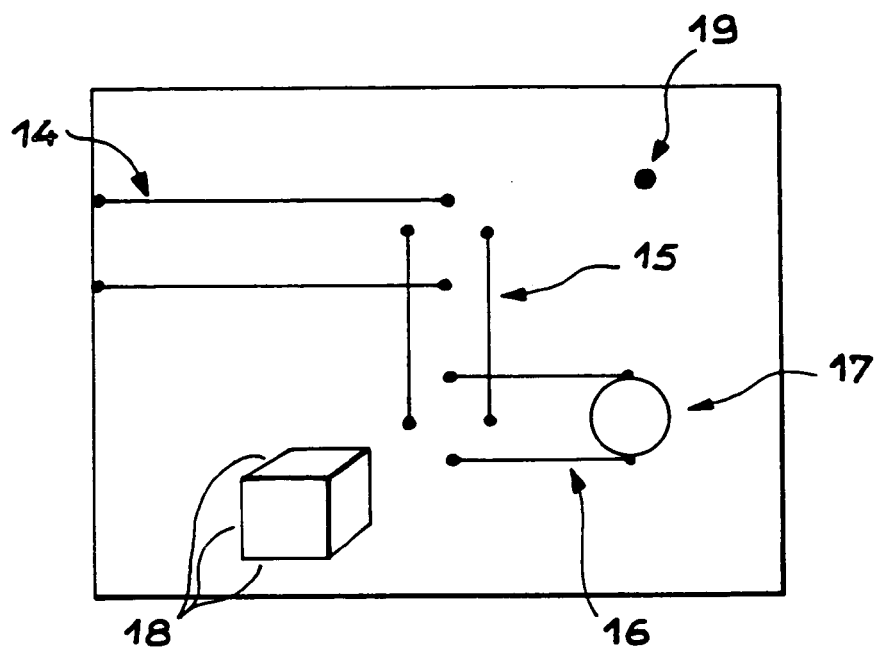
FIG. 1B illustrates how the environment is perceived on an image.

A camera image consists of a network of dots with different shades of gray, that are converted into digital values to be stored in memory 12. FIG. 1B shows that the contours of pipe 1, the opening 4 in the pipe, the box 5 and the lamp 6 may each be represented by three pairs of segments 14, 15 and 16 (in this case called limbs) that are parallel or approximately parallel, an ellipse 17, nine straight line segments 18, and a dot 19. In practice, these contours separate portions with different colors on the image and are therefore discontinuities, which are used to measure them; this is the task performed by the positioning module 20.

Positioning of natural contours on an image is based on "deformable" models or active contours (see the article by Kaas, Witkin and Terzopoulos "Snake: active contour models" published in the International Journal of Computer Vision, 1(4), p 321 to 331, January 1988 and the Bascle's thesis at the University of Nice—Sophia Antipolis (January 1994) "Contributions et applications des modèles déformables en vision par ordinateur—Contributions and applications of deformable models in computer vision". They consist of digitally varying a deformable contour model starting from an initial position while calculating its energy after each deformation. This energy conventionally includes two terms, the first of which expresses the geometric regularity of the model and takes account of any physical properties, and the second takes account of the match between the model and the experimental image obtained. Specifically, the purpose of this processing is to regularize the model by reducing its local irregularities, usually due to noise, without getting too different from the information in the image; but it only works well on fairly simple images, which is not the case here. Furthermore, this invention proposes an improvement by describing some elements of the image by global geometric parameters. Therefore, we can say that the environment models that will be obtained will be both deformable and parametric.

The shapes of the contours in which we are interested here are simple and belong to a few preferred types that are encountered very frequently in reality; as shown on FIG. 1B, the main types are a dot, straight line, double straight line and an ellipse. A dot will be modeled by its Cartesian coordinates x and y on the image. Since the images are finite, the straight lines will be modeled by segments and they will have four parameters on the image, namely the coordinates $x_0$ and $y_0$ of the middle of the segment, the length L of the segment and the angle $\theta$ formed between the segment and the horizontal on the image, as shown on FIG. 3. All dots on the segment will satisfy the following equations:

$$\left[\left\{\begin{array}{l} x = x_0 + u\frac{L}{2}\cos\theta \\ y = y_0 + u\frac{L}{2}\sin\theta \end{array}\right\}\right] \quad (1)$$

where u is between −1 and +1 and $\theta$ is between 0 and $\pi$.

Figure 4:
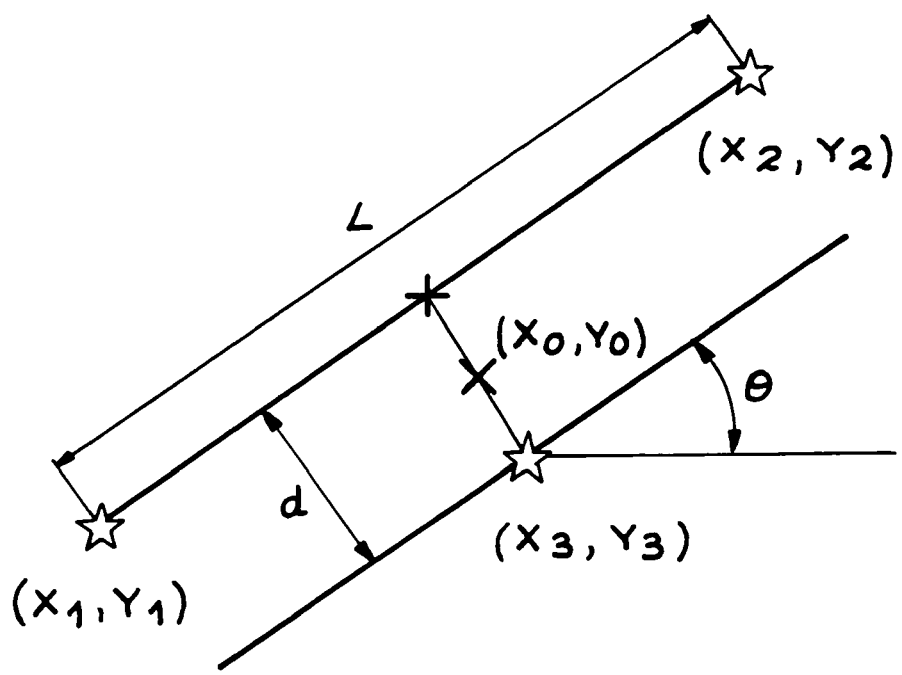

A cylinder will be defined by its contours or limbs. It will consist of two parallel segments, unless the perspective effect is considered. A suitable model is shown in FIG. 4 that comprises five parameters; the coordinates $x_0$ and $y_0$ of the isocenter of gravity of the system formed by the two segments, the common length L of the two segments, the angle $\theta$ formed between the two segments and the horizontal and the distance d separating the two segments. The coordinates of the dots of the two segments are given by the following equations:

$$\begin{cases} x = x_0 + u\frac{L}{2}\cos(\theta) + \frac{d}{2}\sin(\theta) \\ y = y_0 + u\frac{L}{2}\sin(\theta) - \frac{d}{2}\cos(\theta) \end{cases} \text{ and } \quad (2)$$

$$\begin{cases} x = x_0 + u\frac{L}{2}\cos(\theta) - \frac{d}{2}\sin(\theta) \\ y = y_0 + u\frac{L}{2}\sin(\theta) + \frac{d}{2}\cos(\theta) \end{cases} \quad (3)$$

where u (path parameter) is between −1 and +1.

Figure 5:
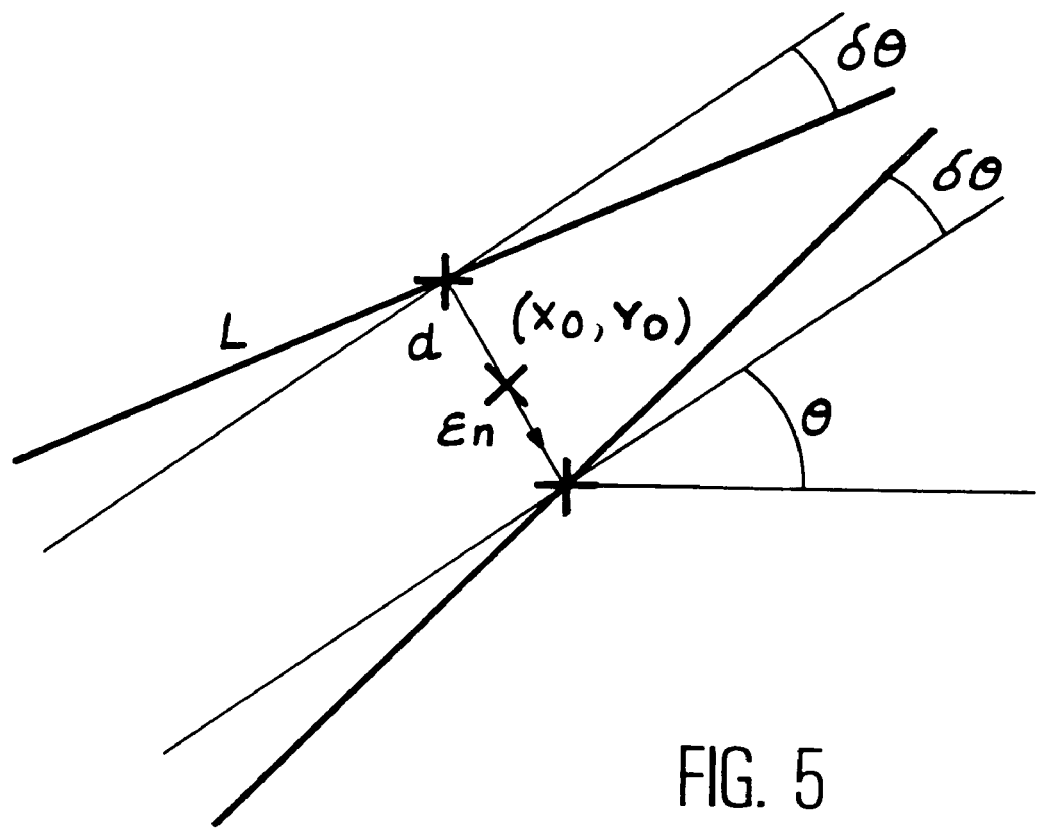

But if we want to take account of a perspective effect, the previous model can be enriched by parameters δθ expressing deviations in opposite directions and making the two segments converge, as shown in FIG. 5; there are then four dots selected by the operator. The equations $$\begin{cases} x = x_0 + u\frac{L}{2}\cos(\theta + \delta\theta) + \frac{d}{2}\sin(\theta) \\ y = y_0 + u\frac{L}{2}\sin(\theta + \delta\theta) - \frac{d}{2}\cos(\theta) \end{cases} \text{ and } \quad (4)$$

$$\begin{cases} x = x_0 + u\frac{L}{2}\cos(\theta - \delta\theta) - \frac{d}{2}\sin(\theta) \\ y = y_0 + u\frac{L}{2}\sin(\theta - \delta\theta) + \frac{d}{2}\cos(\theta) \end{cases} \quad (5)$$

replace equations 2 and 3.

Figure 6:
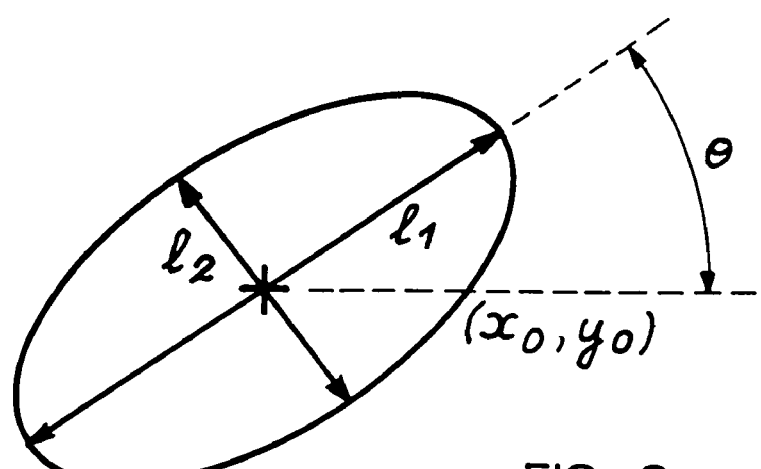

Projection of a circle in space onto a two-dimensional image forms an ellipse, and FIG. 6 shows one possible way of defining parameters for this ellipse; the parameters are the coordinates $x_0$ and $y_0$ of the center, the lengths $l_1$ and $l_2$ of the large and small axis and the orientation θ of the large axis with respect to the horizontal. The equations $$\begin{cases} x = x_0 + l_1\cos(\theta)\cos(u) - l_2\sin(\theta)\sin(u) \\ x = y_0 + l_1\sin(\theta)\cos(u) - l_2\cos(\theta)\cos(u) \end{cases} \quad (6)$$

give the coordinates of dots on the ellipse, where u is a curved abscissa parameter between 0 and 2π.

The process begins by initializing the representation of the environment, usually manually, in which an operator examines one of the images on a computer screen and marks the contours to be modeled. After choosing the appropriate contour type, he chooses a sufficient number of dots on the screen to define this contour and enable a first calculation of the parameters.

Figure 3:
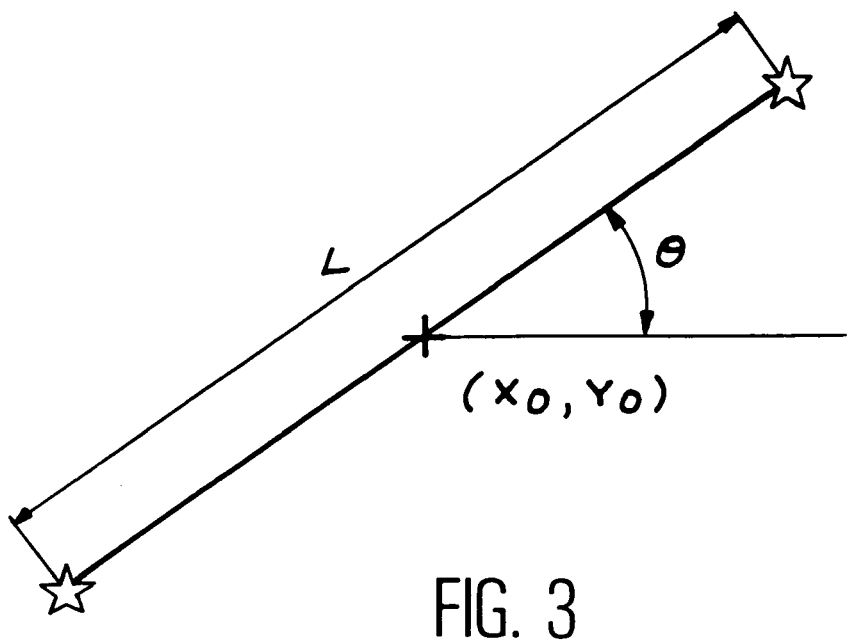

These dots are marked by stars on FIGS. 3 and 4; they are the ends of the segment, and the ends of one limb of the cylinder and a dot on the other limb. An ellipse is defined by 5 dots.

The next step is to match the contour selected by the operator, or selected automatically on the image by using a potential function using calculations made by the positioning module 20. In general, an improvement to a model on an image is evaluated by successively reduction of a function Pe called the potential function that includes several terms. In most cases, the energy term alone is sufficient. The image is processed by calculating the differences in digitized shades of gray of adjacent dots, to relate a high potential intensity to each dot on the image if the dot is within an area with a uniform color, and a low potential intensity if it is located in a transition or color discontinuity area. This is done for each dot on the image. If a potential image was shown, it would show dark areas around the contours of objects, and usually a light background elsewhere. The sum of the potential of a contour is calculated on all its dots, and then a digital analysis algorithm by reduced gradient is used to calculate potential variations as a function of the variation of contour parameters. In this case, the objective is to minimize the root mean square ε of the potential Pe along the contour C, using the following equation $$\varepsilon_{\min}(a) = \left\| \sum_{x,y \in C} P_e(x(a), y(a)) \right\|^2 \quad (7)$$

where a is the model parameters vector and x, y are the abscissas and ordinates of the dots on the contour. Apart from the rate of convergence, this digital tool has the advantage that it provides an evaluation of the covariance matrix on the estimated model, denoted $\Delta_a$. This information will be used by the three-dimensional reconstruction and positioning module.

A special distance given by equation $$f(d) = 1 - e\left(\frac{d^2}{2\sigma^2}\right) \quad (8)$$

is used to calculate the potential Pe of dots on the image. This special distance has the advantages of being quadratic close to zero, in other words to the contour, and approximately constant when the Euclidian distance between dots on the image d becomes large. σ is a fixed coefficient. This distance is comparable to a weighting coefficient that attenuates the influence of remote dots in the calculation of the potential Pe.

However, an additional potential term is used in addition to the previous term Pe for cylinder contours. It frequently arises that these elements are affected by lighting variations that create highly reflecting bands of brightness towards which the deformable model may converge by confusing them with contours. The use of this additional term avoids this danger; it is a conventionally very high potential term for strongly illuminated dots; the total potential thus modified becomes high close to reflecting bands, which pushes the modeled contours towards real contours of the cylinder.

Note also the influence of geometric aberrations introduced by the lenses of an objective; a straight line in space is projected onto the image as a curved segment, rather than a straight line segment. The deformable models described here cannot give a perfect approximation of this type of deformed parts, but a process for correction of geometric aberrations can be used to apply the process according to the invention to corrected images, obtained without distortion. This correction process is made for all dots on the image at the same time in advance, and the corrected image is stored in memory 12.

Geometric aberrations are composed of two terms, including one radial distortion term that moves a dot radially with respect to the optical center of the image and is expressed as a polynomial with equation $$\delta_r(r) = K_1 r^3 + K_2 r^5 + K_3 r^7 \qquad (9)$$

as a function of the radial distance $r = \sqrt{x^2 + y^2}$; and a tangential distortion term that includes a tangential component and a radial component in accordance with the following equations:

$$\begin{cases} \delta_T(x) = P_1(r^2 + 2x) + 2P_2 xy \\ \delta_T(x) = P_2(r^2 + 2y) + 2P_1 xy \end{cases} \qquad (10)$$

The coefficients $K_1$, $K_2$, $K_3$ and $P_1$ and $P_2$ are distortion coefficients estimated while the camera is being calibrated.

The radial distortion is estimated by a preliminary calculation of an aberration table as a function of the radial distance. For each radial distance $r_D$ from the center of a distorted calibration image, this table contains the corresponding distance $r_{ND}$ of the same position in the undistorted image. The separation between successive values of the distances $r_D$ stored in the table is chosen such that the minimum precision $\Delta$ between the successive values of the corrected distance $r_{ND}$ is respected. The precision of this process can be as high as one tenth of the distance between two successive dots on the image.

It is not intended to use the same method in this invention to take account of tangential distortion, since tables giving corrections as a function of the x and y coordinates should apply to all dots on the image and would occupy too much space in memory. This is why it is recommended that an equation roots search algorithm based on equations (10) should be used, such as Powell's algorithm that is well known to a person skilled in the art, if these tangential distortions have to be taken into account.

We will now go on to describe the second module 21 of the operating system, which is a module for reconstruction and positioning that makes use of the positions of contours of objects detected previously on the images to determine the position of these objects in the environment, in other words to build up a three-dimensional representation of the environment while calculating the position of the image sensor 7 in a positioning step. The process is recurrent, in other words the images are used in sequence, the representation of the environment being added to and corrected each time to make it more precise. It is an application of the Kalman filter. This presentation describes the use of a stereoscopic sensor 7 with two cameras, but the process would be applicable to a sensor with a single camera; reconstruction and positioning can be evaluated except for a scale factor, that can be determined by inputting additional information into the system, such as a distance between two dots or the radius of a cylinder.

The following describes the formulas that relate the vector, $x_k$ of parameters of the object detected in an absolute coordinate system and the vector $z_k^i$ of its observation coordinates in this image, for a camera with index i of the sensor that took an image at instant k. The position of the camera will be noted by a rotation matrix $R_k^i$ and a translation vector $t_k^i$ in the absolute coordinate system. Transfer formulas are denoted by the letter h.

In the case of a dot, the equations $$h_P^i(x_k, z_k^i) = \begin{pmatrix} u - f\frac{x_k}{z_k} \\ v - f\frac{y_k}{z_k} \end{pmatrix} = 0 \qquad (11)$$

in which $(x_k, y_k, z_k)^t = R_k^i (x, y, z)^t + t_k^i$ are respected, where $x_k = (x, y, z)^t$, $z_k^i = (u, v)$.

In the case of a straight line, $x_k$ and $z_k^i$ are defined by vectors (13) $x_k = (x, y, z, \beta, \phi)^t$, $z_k^i = (x, y, z, \beta, \phi)^t$, $z_k^i = (u, v, \theta)$, in which $\beta$ and $\phi$ are the spherical coordinates of the unit vector of the straight line and $\theta$ is the angle formed by its projection onto the image; the formulas $$h_d^i(x_k, z_k^i) = \begin{pmatrix} (m_l - m_P) x v_l \\ v_l \cdot (m_{kx} v_k) \end{pmatrix} = 0 \qquad (14)$$

where x is the vector product, define the conditions to be satisfied, in which $(m_k, v_k)$ are the parameters of the straight line (the coordinates of one of its dots $m_k$ and its unit vector) in accordance with the following equations:

$$m_k = R_k^i m + t_k^i, \quad v_k = R_k^i v, \qquad (15)$$

mp represents the coordinates of the projection of dot $m_k$ onto the image, $m_l$ is the middle of the segment detected on the image and $v_l$ is the unit vector of the segment in accordance with FIG. 7, and $m_l$ and $v_l$ are deduced from $z_k$.

An infinite cylinder is defined by the vector $$x_k(x, y, z, \beta, \phi, r)^t, \qquad (16)$$

in which x, y and z are the coordinates (denoted m) of a dot on its axis, $\beta$ and $\phi$ are the spherical coordinates (denoted v) of the unit vector along its axis, and r is its radius. The equations $$m_k = R_k^i m + t_k^i \text{ and } v_k = R_k^i v \qquad (17)$$

express the position of the axis of the cylinder in the coordinate system of camera i at time k. The coordinates of its limbs $(m_1, v_1)$ and $(m_2, v_2)$, and $mp_1$ and $mp_2$, the projections of dots $m_1$ and $m_2$ of the limbs onto the image, are also calculated. The measured parameters on the image $$(u, v, \theta, \delta\theta, d) \qquad (18)$$

are used to deduce the observation vector $z_k = (u_1, v_1, \theta_1, u_2, v_2, \theta_2)$ corresponding to the mid-dots and the orientations of the two observed limbs and the following measurement equation is obtained:

$$h_{cy}^i(x_k, z_k^i) = \begin{pmatrix} (m_{l1} - m_{P1}) x v_{l1} \\ v_{l1} \cdot (m_l x v_l) \\ (m_{l2} - m_{P2}) x v_{l2} \\ v_{l2} \cdot (m_2 x v_2) \end{pmatrix} = 0 \qquad (19)$$

FIG. 8 shows these parameters. $v_{l1}$ and $m_{l1}$, $v_{l2}$ and $m_{l2}$ are deduced from $z_k$, as in the case of the straight line.

The circle is defined by a state vector conform with the following formula:

$$x_k = (x, y, z, \beta, \phi, r)^t, \quad (20)$$

where x, y and z denote the coordinates of its center, $\beta$ and $\phi$ the spherical coordinates of the unit vector along its normal and r is its radius. Furthermore, the formulas $$m_k = R_k^i m + t_k^i \text{ and } v_k = R_k^i v \quad (21)$$

are applicable. If observation coordinates are represented by the function $$z_k^i = (u, v, l_1, l_2, \theta), \quad (22)$$

the following equations $$h_c^i(x_k, z_k^i) = \begin{pmatrix} q_0 - ((b^2(x_k^2 + y_k^2 + z_k^2 - r^2) + 1 - 2by_k)/Q) \\ q_1 - ((2ab(x_k^2 + y_k^2 + z_k^2 - r^2 2bx_k - 2ay_k)/Q)) \\ q_2 - ((2ac(x_k^2 + y_k^2 + z_k^2 - r^2) - 2cx_k - 2az_k)/Q) \\ q_3 - ((2bc(x_k^2 + y_k^2 + z_k^2 - r^2) - 2cy_k - 2bz_k)/Q \\ q_4 - ((c^2(x_k^2 + y_k^2 + z_k^2 - r^2) + 1 - 2cz_k)/Q) \end{pmatrix} = 0 \quad (23)$$

where $Q = a^2(x_k^2 + y_k^2 + z_k^2 - r^2) + 1 - 2bx_k$ express the transfer between the state vector and observations, in which $q_0, \ldots, q_4$ are derived from conversion of parameters (22) to obtain a representation of the ellipse in implicit form such that $u^2 + q_0 v^2 + q_1 uv + q_2 u + q_3 v + q_4 = 0$.

We will now go on to the description of the reconstruction process in the special case of a sensor formed from two cameras fixed with respect to each other, denoted by their indexes 1 and r and simultaneously taking an image. For a dot, the global observation vector can be expressed by $$z_k = (u^1, v^1, u^r, v^r, \chi_k, \beta_k, \alpha_k, t_{xk}, t_{yk}, t_{zk}) \quad (24)$$

where $u^1$, $v^1$, $u^r$ and $v^r$ are the coordinates of the dot on the two images and the other parameters are the orientation and translation vectors of the sensor in the absolute coordinate system. The dot observation function is then given by the following equation $$h_p(x_k, z_k) = \begin{pmatrix} h_p^1(x_k, z_k^1) \\ h_p^r(x_k, z_k^r) \end{pmatrix} = 0, \quad (25)$$

for which the solution (which is a duplication of equation (11) for the two cameras) gives an evaluation of the state vector $x_k$ of the dot, composed of coordinates x, y and z in the absolute coordinate system.

The position of a straight line is determined by obtaining an observation vector $$z_k = (u^1, v^1, \theta^1, u^r, v^r, \theta^r, \chi_k, \beta_k, \alpha_k, t_{xk}, t_{yk}, t_{zk})^t \quad (26)$$

and solving the following equations $$h_d(x_k, z_k) = \begin{pmatrix} h_d^1(x_k, z_k^1) \\ h_d^r(x_k, z_k^r) \end{pmatrix} = 0, \quad (27)$$

analogically; note that the $\theta$ parameters are the angles between the projections of the straight line onto the images 1 and r and the horizontal. However, note that since straight line segments are observed rather than the straight lines themselves, the state vector for a straight line is given by the formula $$x_k = (a, b, p, q)^t, \quad (28)$$

rather than by the coordinates of a dot on the straight line and the unit vector along this straight line. For each acquisition, the straight line estimated by the parameters of the state vector a, b, p and q is expressed in the form of a finite straight line with parameters x, y, z, $\beta$, $\phi$ and l where l denotes the length of the segment and the coordinates x, y and z denote the middle of this segment. These coordinates x, y and z are evaluated by reprojection into the image. The definition of parameters a, b, p and q is as follows:

the straight line has a unit vector (1, a, b) and a position vector (0, p, q) unless it is perpendicular to the $0_x$ axis;
it may be defined by the unit vector (a, 1, b) and a position vector (p, 0, q) unless it is perpendicular to the $O_y$ axis;
and by a unit vector (n, b, 1) and a position vector (p, q, 0), unless it is perpendicular to the $O_z$ axis. A preferred convention defines a priority when several of these representations are possible.

The cylinder is also defined in the representation by the parameters a, b, p and q of its axis and by its radius, using the formula $$x_k = (a, b, p, q, r)^t. \quad (29)$$

The observation vector is defined by the formula $$z_k = (u_1^1, v_1^1, \theta_1^1, u_2^1, v_2^1, \theta_2^1, u_1^r, v_1^r, \theta_1^r, u_2^r, v_2^r, \theta_2^r, \chi_k, \beta_k, \alpha_k, t_{xk}, t_{yk}, t_{zk})^t. \quad (30)$$

The system of equations $$h_{cy}(x_k, z_k) = \begin{pmatrix} h_{cy}^1(x_k, z_k^1) \\ h_{cy}^r(x_k, z_k^r) \end{pmatrix} = 0 \quad (31)$$

must be solved. Finally, the state vector of a circle is defined by the following formula $$x_k = (x, y, z, \beta, \phi, r)^t, \quad (32)$$

and the observation vector is defined by the formula $$z_k = (u^1, v^1, l_1^1, l_2^1, \theta^1, u^r, v^r, l_1^r, l_2^r, \theta^r, \alpha_k, \beta_k, \chi_k, t_{xk}, t_{yk}, t_{zk})^t, \quad (33)$$

and the system of equations $$h_{cy}(x_k, z_k) = \begin{pmatrix} h_{cy}^1(x_k, z_k^1) \\ h_{cy}^r(x_k, z_k^r) \end{pmatrix} = 0 \quad (34)$$

must be solved.

The estimated position of the object is refined for each new acquisition. When an object appears in a pair of images for the first time, this estimate is initialized by a preliminary reconstruction by triangulation. Prior art already contains descriptions of such methods. A suitable initialization makes the estimate of the position of the object converge more quickly for each new image.

Reconstruction of the three-dimensional environment requires the position of the sensor to be determined; this position is usually not known, or is known but with an insufficient precision. For each new acquisition, dots previously reconstructed in the environment are used and their observation vector is used for pre-positioning of the sensor by searching for $$\min(\chi_k, \beta_k, \alpha_k, t_x, t_y, t_z) = \sum_j \|h_p^j(x_k, z_k^j)\|^2, \quad (36)$$

in other words the values $\chi_k$, $\beta_k$, $\alpha_k$, $t_{xk}$, $t_{yk}$, $t_{zk}$ that give the best agreement between the representation of the environment and its image on the cameras (h close to 0) for all dots j in the model. The following equations are then solved recurrently:

$$h_p(x_k,z_k)=0,\ h_d(x_k,z_k)=0,\ h_{cy}(x_k,z_k)=0,\ \text{or}\ h_c(x_k,z_k)=0 \quad (37)$$

(one for each object already built, depending on the category of the object), in which observation vectors $z_k$ are given by the appropriate formula $$z_k=(u^1,v^1,u^r,v^r,x,y,z)^t, \quad (38)$$

$$z_k=(u^1,v^1,\theta^1,u^r,v^r,\theta^r,x,y,z,\beta,\phi)^t,$$

$$z_k=(u_1^1,v_1^1,\theta_1^1,u_2^1,v_2^1,\theta_2^1,u_1^r,v_1^r,\theta_2^r,x,y,z,\beta\phi r)^t.$$

or $$z_k=(u^1,v^1,l_1^1,l_2^1,\theta^1,u^r,v^r l_1^r,l_2^r,\ \theta^r,x,y,z,\beta,\phi,r)^t$$

this is another application of the Kalman filter in which the estimated state vector in this case is ($\chi_k$, $\beta_k$, $\alpha_k$, $t_{xk}$, $t_{yk}$, $t_{zk}$). Module 22 performs this positioning.

The identification module 23 of the system automatically identifies at least some of the contours defined in the previous calculations, each time that an image is taken. It is proposed to proceed as follows:
    select a previous image $k_0$, preferably close to the current image k concerning positions and orientations of the photo;
    select points of interest $I_0$ on this previous image $k_0$, which can be done automatically, the points of interest having the general property that the brightness gradient close to them is high, and is not usually sensitive to changes in image taking conditions (lighting, zoom, view exposure). Therefore a characteristic dot already identified with an image $k_0$ will usually be identified again on the next image k, unless it is hidden by another object in the environment;
    when the points of interest $I_0$ and $I_K$ in the two images have been found, they are made to correspond from one image to the next; this can be done using the brightness information close to each of them, since this is what could best characterize them, it is coded in vector form using different filters. For each point of interest $I_k$ in the new image k, the module searches among the points of interest $I_0$ in the previous image $k_0$ to find the dot most similar to it by calculating a correlation score or a vector distance (for example see the work done by C. Schmid "Appariement d'images par invariants locaux de niveaux de gris—Matching of images using local gray shade invariables", INPG PhD thesis, 1996);
    after correspondence has been identified between pairs of points of interest, assumed to originate from projections of a single dot in the environment onto two images, a correspondence matrix between the two images is thus obtained. It is then possible to use this matrix to project the previously estimated three-dimensional model onto the current image. The contours thus obtained are used for a preliminary estimate of object contours for the new image k, and they are used by applying the process described above for module 20 to these contours, using deformable models. Therefore, the operator does not have to start selecting contours on the new image k all over again. Obviously, he can correct contours that appear to be incorrect or can eliminate contours that are hidden by other objects in the environment. Since the program is designed to eliminate contours hidden by objects already included in the model by itself, the operator should only need to eliminate hidden contours of objects that have not yet been identified. However, he must introduce contours appearing on image k for the first time.

The last module performs a three-dimensional block calculation. This is done using module 24 when all images in the environment have been used as described and a complete representation of the environment has been produced. The calculation is carried out as follows:
    starting from parameters $R_k^i$ and $t_k^i$ known in advance for each image k, the projections of the contours of the representation onto the camera images planes are calculated;
    the deviations between the positions of the projected contours and the positions of the same contours estimated previously on the same images are calculated;
    the positions of the contours in the representation are re-evaluated in order to minimize the deviations.

The next step is to use a least squares method, minimizing a global error. A vector $x=(x_{G1} \ldots x_{Gn} x_{M1} \ldots x_{MP})^T$ can be defined in which the $x_G$ values contain the parameters of all n objects of the representation and the $x_M$ values contain the parameters of the p photos ($\alpha$, $\beta$, $\chi$, $t_x$, $t_y$, $t_z$)$^T$, together with a measurement vector z that contains all observations made for each object and for each image. The adjustment made by module 24 is equivalent to minimizing an error function F(x,z,a) in which a denotes known information about the image taking means (for example intrinsic parameters, optical center, focal length, scale and distortion factors) or about the representation (for example the parameters of vector x that are assumed to be well determined or known). Weightings of the different parameters may be introduced. Therefore, this module 24 can evaluate uncertainties of the representation of the environment and can reduce them by modifying estimated image taking parameters.

Some parameters can be corrected or blocked. The parameters used are u and v for a dot, $\theta$ and d (distance to the origin of the image coordinate system) for a straight line and each cylinder limb. Furthermore, the coordinates u and v of the ends of straight line and cylinder segments are also used.

The block calculation can also be used to measure the position and orientation of one or several objects using a single image and a camera. This can only be done if additional information about the objects is available; the geometric characteristics of each object must be known and injected into the block calculation. The measurement of projections of these said characteristics in a single image is sufficient to determine the position and orientation of the object. It will be necessary to make sure that a sufficient number of characteristics is available to evaluate all position and orientation parameters.

The invention claimed is:

1. A process for measuring three-dimensional objects in a three-dimensional environment, comprising the steps of:
    taking at least one image of said environment by at least one camera;

detecting discontinuities of appearance in the image;

relating said discontinuities with geometric contours, said contours having positions and shapes in the image which are defined by parameters including numerals;

matching said geometric contours with said discontinuities by adjusting said parameters;

numerically relating said geometric contours with geometric objects in the three-dimensional environment, three-dimensional positions and volume shapes of said geometric objects in the three-dimensional environment being defined by three-dimensional parameters including numerals;

estimating said three-dimensional positions and volume shapes of said geometric objects in the three-dimensional environment in computing geometric projections of said geometric objects onto said at least one image according to a match between said projection and said geometric contours; and, creating a representation of the three-dimensional environment, said representation comprising said geometric objects, according to the parameters defining the positions and shapes of said geometric objects.

2. The process according to claim 1, characterized in that the geometric contours include dots, straight lines, ellipses, and the objects include circles, cylinders, straight lines and dots.

3. The process according to claim 2, characterized in that the parameters include plane Cartesian coordinates, angles and lengths.

4. The process according to claim 1, characterized in that said at least one image is converted into an image of a potential function computed on pixels of said at least one image, the potential function giving extreme values at said discontinuities.

5. The process according to claim 4, characterized in that the potential function includes a term taking account of areas with very low intensity of gray on the images.

6. The process, according to claim 1, wherein said representation comprises a position of said at least one camera.

7. The process according to claim 6, wherein said geometric projections are determined from the position of said camera and positions of said geometric objects in the representation.

8. The process according to claim 1, wherein the representation initially comprises information on at least the positions and shapes of said geometric objects which is inputted manually or from a computer description file, and the representation is created in progressively amending said information so that the match between the projection of said geometric objects and said geometric contours of said at least one image is improved.

9. The process according to claim 1, wherein a plurality of said images is taken, and said representation of the three dimensional environment is amended in repeating the process for each of said images using numerical adjustment of the parameter.

10. The process according to claim 9, wherein said representation of the three-dimensional environment in amended in amending the positions and shapes of said geometric objects for each of said images.

11. The process according to claim 9, wherein said representation of the three-dimensional environment is amended in including said geometric objects into and camera position said representation and in repeating the process for different ones of said images.

12. The process according to claim 9, wherein a geometric projection of the contour of the three-dimensional object is performed on each new image before detecting discontinuities of appearance in the new image.

13. The process according to claim 11, wherein said projected contours are adjusted relatively to the image discontinuities.

* * * * *

UNITED STATES PATENT AND TRADEMARK OFFICE
CERTIFICATE OF CORRECTION

PATENT NO. : 7,092,562 B2
APPLICATION NO. : 10/019871
DATED : August 15, 2006
INVENTOR(S) : Viala et al.

It is certified that error appears in the above-identified patent and that said Letters Patent is hereby corrected as shown below:

In Column 9, Line 20, please delete the ")" at the end of the equation after "Q"

In Column 11, Line 25, please delete the following equation:
"$z_k = (u_1^1, v_1^1, \theta_1^1, u_2^1, v_2^1, \theta_2^1, u_1^r, v_1^r, \theta_2^r \; x,y,z, \beta\phi r)^t.$"

And insert this equation in its place:
--$z_k = (u_1^1, v_1^1, \theta_1^1, u_2^1, v_2^1, \theta_2^1, u_1^r, v_1^r, \theta_1^r, u_2^r, v_2^r, \theta_2^r, x,y,z, \beta\phi r)^t.$--

Signed and Sealed this

Fifth Day of December, 2006

JON W. DUDAS
*Director of the United States Patent and Trademark Office*